J. M. MATTHEWS.
Plow.
No. 216,050.                    Patented June 3, 1879.
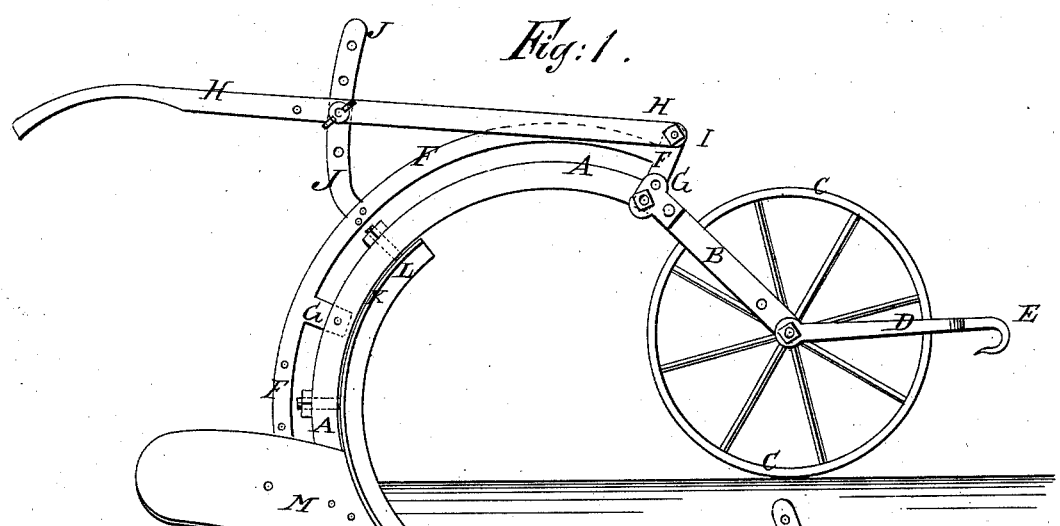
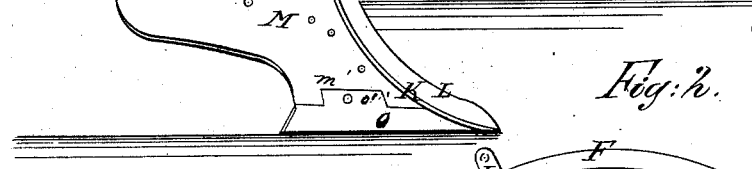
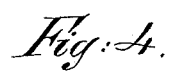
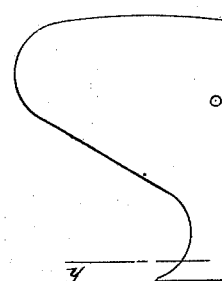
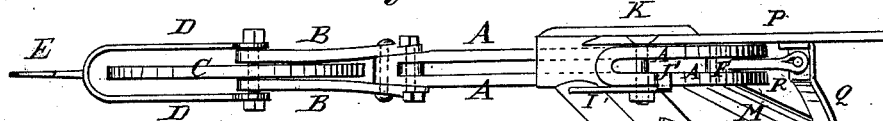
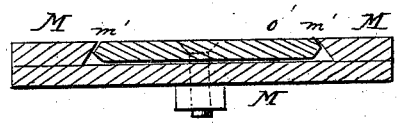
WITNESSES:                                   INVENTOR:
Chas. Nida                                   J. M. Matthews
C. Sedgwick                              BY  Munn & Co
                                             ATTORNEYS.
N. PETERS, PHOTO-LITHOGRAPHER, WASHINGTON, D.C.

UNITED STATES PATENT OFFICE.

JAMES M. MATTHEWS, OF KNOXVILLE, TENNESSEE.

IMPROVEMENT IN PLOWS.

Specification forming part of Letters Patent No. 216,050, dated June 3, 1879; application filed August 8, 1878.

*To all whom it may concern:*

Be it known that I, JAMES MADISON MATTHEWS, of Knoxville, in the county of Knox and State of Tennessee, have invented a new and useful Improvement in Plows, of which the following is a specification.

Figure 1 is a view of the mold-board side of my improved plow, arranged as a turn-plow. Fig. 2 is a view of the land-side side of the same, the handles, adjustable bars, gage-wheel, and draw-hook being removed. Fig. 3 is a bottom view of the same. Fig. 4 is a detail view of the mold-board, showing the fastening-hooks and the seat for the share. Fig. 5 is a detail section, taken through the broken line $x\ x$, Fig. 2. Fig. 6 is a detail section of the mold-board and share, taken through the line $y\ y$, Fig. 4.

The invention will first be described in connection with the drawings, and then pointed out in the claims.

A is the plow stock or beam and standard, which is made of two bars of iron bent into a semicircular arc, and welded together at their ends in such a way as to leave a space between the said bars to receive the bolts for securing to it the attachments. To the opposite sides of the forward end of the beam A are secured, by two bolts, the rear ends of two bars, B, to and between the forward ends of which is pivoted the gage-wheel C. Several holes are formed through the rear ends of the bars B, which are widened for this purpose, to receive the rear fastening-bolt, so that the said bars B can be adjusted to regulate the depth to which the plow enters the ground.

D is the draw-bar, which is made in U shape, and its ends are pivoted to the bolt that pivots the gage-wheel C to the bars B. The draw-bar D at its bend is provided with a hook or clevis, E, for convenience in attaching the horse or horses. F is a bar bent into the form of a semicircular arc, placed at a little distance from the convex side of the beam A, and provided with three or more inwardly-projecting lugs, G, which fit in between and are bolted or riveted to the bars of the beam A. H are the handles, the forward ends of which are bolted to the opposite sides of the short upwardly-projecting arm I, formed upon the upper end of the bar F. The middle parts of the handles H are bolted to the opposite sides of the long arm J, formed upon or rigidly attached to the upper middle part of the curved bar F. The arm J is curved upon the arc of a circle having its center in the bolt-hole of the short arm I, and has a number of bolt-holes formed through it, so that the handles H may be adjusted as the depth to which the plow enters the ground and the height of the plowman may require.

K is the plow-point, which is made of a flat strip of sheet-steel, is curved to fit upon the inner or concave side of the beam A, and is secured to the said beam A by bolts passing through it and through the space between the bars of the said beam A. The point K may be made from six to thirty inches long, and its land-side edge L is bent forward at right angles, or nearly so, to serve as a colter, as shown in Figs. 1, 2, and 5.

M is the mold-board, the forward edge of which is concaved to correspond with the curvature of the inner side of the beam A, and has two or more hooks, N, formed upon or attached to its rear side to hook into notches formed in the forward side of the bar of the said beam A next the said mold-board M. In the forward side of the lower part of the mold-board M is formed a rectangular recess, $m'$, the end shoulders of which are beveled inward to cause them to act as a dovetail to receive and hold the wide tenon $o'$ of the share O. The side edges of the tenon $o'$ are beveled upon both sides, so that the said tenon $o'$ may fit into the dovetailed recess $m'$ of the mold-board M whichever side of the said share O be outward. The share O is further secured in place by a bolt which passes through the center of the tenon $o'$ and through the mold-board M. The inner end of the share O should underlap the point K, so that grass, weeds, &c., cannot get in between the said parts and impede the working of the plow.

P is the land-side, the forward end of which fits in beneath the point K, and the forward part of which is bolted to the forward end of the beam A.

I' is a rest, the upper edge of which is secured to the mold-board side of the forward end of the beam A by the same bolt that secures the land-side P to the said beam. The upper edge of the rest I' is beveled or curved to correspond with the face of the beam A and to fit against and support the inner corners of the mold-board M and the share O. The rear end of the rest I' has a hook, J', formed upon it to hook upon the beam A and support the downward pressure upon the said rest I'.

The rear part of the mold-board M and of the land-side P are supported against inward pressure by the brace Q, one end of which is bolted to the said mold-board, and its other end is bolted to the said land-side.

The brace Q is bent so that the part of it that is beneath the lower end of the curved bar F is horizontal, and has a hole formed through it to receive a bolt which also passes through a hole in the outer end of the outwardly-projecting arm R, formed upon or rigidly attached to the lower end of the said curved bar F.

Having thus described my invention, I claim as new and desire to secure by Letters Patent—

1. The plow-stock formed of the parallel bars A, curved upon the arc of a circle, and welded together at their ends, the curved brace-bar F, provided with the lugs G, and the arms I J, and the handles H, to adapt it to receive the operating parts of the plow, substantially as herein shown and described.

2. The combination of the mold-board M, provided with the hooks N, the land-side P, the brace Q, and the arm R, with the curved beam A, the curved brace-bar F, and the curved point and colter K L, substantially as herein shown and described.

3. The combination of the rest I', provided with the hook J', with the curved beam A, the curved point and colter K L, the mold-board M, and the share O, substantially as herein shown and described.

JAMES MADISON MATTHEWS.

Witnesses:
   S. D. J. LEWIS,
   M. T. JONES.